United States Patent [19]

Scherzer et al.

[11] Patent Number: 4,812,368
[45] Date of Patent: Mar. 14, 1989

[54] PROCESS FOR THE PREPARATION OF LIGHTWEIGHT, PLANAR MOLDED ARTICLES

[75] Inventors: Dietrich Scherzer, Nottingham, Great Britain; Erwin Zahn, Neustadt; Wolfram Frank, Heidelberg, both of Fed. Rep. of Germany

[73] Assignee: BASF Aktiengesellschaft, Ludwigshafen, Fed. Rep. of Germany

[21] Appl. No.: 136,990

[22] Filed: Dec. 23, 1987

[30] Foreign Application Priority Data

Jan. 7, 1987 [DE] Fed. Rep. of Germany ....... 3700245

[51] Int. Cl.$^4$ .......................... B32B 5/18; B32B 5/24; C08J 7/16; B29C 67/20
[52] U.S. Cl. .................................... 428/332; 264/134; 264/321; 428/423.1
[58] Field of Search ................ 264/134, 321; 428/332, 428/423.1

[56] References Cited

U.S. PATENT DOCUMENTS 4,451,310 5/1984 Lairloup ........................ 264/321 X
4,508,774 4/1985 Grabhoefer et al. ............... 428/220

FOREIGN PATENT DOCUMENTS 0118876 9/1984 European Pat. Off. .
2724363 11/1978 Fed. Rep. of Germany .
2724364 12/1978 Fed. Rep. of Germany .
2703271 6/1979 Fed. Rep. of Germany .
3213610 11/1982 Fed. Rep. of Germany .
3315804 of 1984 Fed. Rep. of Germany .

Primary Examiner—Philip Anderson

[57] ABSTRACT

The subject of this invention is a process for the preparation of lightweight, planar molded articles, e.g. those having a thickness from 0.1 to 40 mm and having a density of 0.015 to 0.25 g/cm$^3$, by treating porous materials, preferably open celled or flexible or semi-rigid polyurethane foams, with an effective amount of an aqueous dispersion or emulsion of organic compounds containing NCO groups and allowing the isocyanate compound to cure, optionally while molding, at a temperature from 25° C. to 180° C. and optionally at a pressure of 1 to 50 bar. The invention also relates to molded articles prepared according to this process which have special mechanical properties.

18 Claims, No Drawings

PROCESS FOR THE PREPARATION OF LIGHTWEIGHT, PLANAR MOLDED ARTICLES

Large planar, thin wall molded articles having low densities, particularly those having complicated spacial dimensions, ordinarily cannot be prepared using the polyisocyanate addition polymerization process by foaming in molds, since the complete and uniform filling of essentially a closed mold with relatively high viscous polyurethane systems cannot be achieved or can only be achieved with great difficulty.

Yet even molded articles prepared using other known processing technologies many times do not satisfy the economic requirements; it may be that the production processes are technologically complicated and therefore costly or the mechanical stability of the molded articles prepared does not satisfy the technological requirements in all properties.

Disclosed in DEA-No. 3315804 are planar, fiber-containing, cellular polyurethane composite molded articles having a thickness of 1 to 20 mm, a density of 0.1 to 1.6 g/cm$^3$ and having good mechanical properties. In preparing the composite molded articles, a planar fiberous arrangement is placed in an open mold, then coated with such an amount of a polyurethane-DUROMER mixture capable of foaming so that the weight ratio of the planar fibrous arrangement to the polyurethane mixture capable of foaming is from 51 to 80 to 49 to 20, and the DUROMER mixture subsequently is foamed in the closed mold. The polyurethane composite molded articles possess isotropic mechanical properties and for many areas of application their densities are to high.

Following specification EPA-No. 118876, thermally moldable polyurethane foam plaques having a thickness from 2 to 200 mm and a density from 15 to 40 g/l are thermoplastically molded, prepared from aromatic polyisocyanates and polyesterpolyols, in a mold having a degree of compression of 1 to 10 and at temperatures from 140° to 200° C. Using this process, one is able to prepare self-supporting, large planar molded articles having complicated spacial dimensions with low densities exactly according to contour rapidly and in large numbers. The process which is often too expensive for certain areas of application however does allow for the processing of thermoformable polyester polyurethane foams.

Lightweight, flexible or rigid, panel shaped elements may be prepared following specification DEA-No. 3213610 (U.S. Pat. No. 4,451,310) by impregnating a flexible porous material with a solution of an isocyanate compound in a chlorinated organic solvent, pressing out the excess quantity of the isocyanate solution and reacting the isocyanate compound with water to form urea and/or biuret derivatives. By using a organic solvent in the preparation of the polyisocyanate solution and only partially recovering this solvent, the process becomes costly and expensive.

Also disclosed in German Patent Nos. 2703271, 2724363 and 2724364 are aqueous isocyanate emulsions for gluing stress panels.

The object of the present invention was to develop an improved economical process for the preparation of light weight, preferably large planar, molded articles, which would either completely or at least partially overcome the aforesaid disadvantages and which would allow for the environmentally safe preparation of light weight molded articles.

This object was met by using dispersions or preferably emulsions of NCO group containing organic compounds in water.

The subject of the invention is accordingly a process for the preparation of lightweight, planar molded articles by treating porous materials with an effective amount of an NCO group containing organic compound and allowing the isocyanate compound to cure, optionally while molding, wherein the NCO group containing organic compound is used in the form of an aqueous dispersion or emulsion.

Moreover, the subject of the invention are planar polyurethane molded articles having a thickness of 0.1 to 40 mm, more preferably from 3 to 8 mm, a density of 0.015 to 0.25 g/cm$^3$ more preferably from 0.03 to 0.08 g/cm$^3$, a tensile strength according to DIN 53571 of 100 to 500 kPA, an elongation at break according to DIN 53571 of from 10 to 70 percent, a compression hardness at a 40 percent load according to DIN 53577 of 10 to 100 kPA and having a thermal flexural strength according to DIN 53424 of 100° C. to 160° C., prepared according to the process of claims 1 or 2 while using open-celled, flexible or semi-rigid polyurethane foams as porous materials.

By using non-flammable, aqueous dispersions or emulsions in place of solutions of organic, optionally modified polyisocyanates and flammable and/or toxic solvents, one does not require expensive explosion proof equipment and plants. Non-flammable solvents like e.g. chlorinated hydrocarbons are unsuitable because of toxicological reasons. One is likewise able to dispense with the strict requirement for the exclusion of moisture before separating the organic solvent and one can also dispense with equipment for recovering the organic solvent. The porous materials are able to be treated in one step, at the same time with NCO group containing organic compounds and water.

In preparing the lightweight, planar, preferably large planar molded articles, aqueous dispersions or preferably aqueous emulsions are suitable which at relatively low temperatures, e.g. at temperatures below 30° C., are regarded as stable for a time period of e.g. 1 to 12 hours, and based on the entire weight comprising: 5 to 70 weight percent, more preferably 15 to 40 weight percent, of at least one organic polyisocyanate and/or modified organic polyisocyanate, 0 to 28 weight percent, more preferably 0 to 15 weight percent, of at least 1 emulsifier and the remainder water so that the total of the components results in 100 percent.

Aliphatic, cycloaliphatic, and preferably aromatic multivalent isocyanates are used e.g. as organic polyisocyanates in the preparation of aqueous dispersions or emulsions. Individual examples are: 1,6-hexamethylene diisocyanate, 2-methyl-1,5-pentamethylene-diisocyanate, 2-ethyl-1,4-butylene-diisocyanate or the corresponding isomeric mixtures, 1-isocyanato-3,3,5-trimethyl-3-isocyanatomethylcyclohexane, 1,3- and 1,4-diisocyanato-cyclohexane, 2,4- and 2,6-hexahydrotoluene-diisocyanate as well as the corresponding isomeric mixtures, 4,4'-, 2,2'- and 2,4'-dicyclohexylmethane-diisocyanate as well as the corresponding isomeric mixtures, mixtures of 4,4'-, 2,2'-, and 2,4'-dicyclohexylmethane-diisocyanates and polymethylene-polycyclohexylene-polyisocyanates, 2,4- and 2,6 toluene-diisocyanate and the corresponding isomeric mixtures, 4,4'-, 2,4'-, and 2,2'-diphenylmethane-diisocyanate and the corresponding isomeric mixtures mixtures of 4,4'-, 2,4'- and 2,2'-diphenylmethane-diisocyanates and polyphenylpolymethylenepolyisocyanates (Polymeric MDI) and mixtures of polymeric MDI and toluene diisocyanates.

Suitable also are the so-called modified polyisocyanates, i.e. products which are obtained by the chemical reaction of the above di- and/or polyisocyanates. Suitable are, e.g., ester, urea, biuret, allophanate and preferably carbodiimide, isocyanurate and/or urethane group containing di- and/or polyisocyanates. Examples of such polyisocyanates are: carbodiimide and/or urethane group and isocyanurate ring containing polyisocyanates, e.g. from diphenylmethane-diisocyanate and/or toluene-diisocyanate-isomers as well as with dialkylene, trialkylene and/or polyoxyalkylene-glycols based on ethylene oxide and/or 1,2-propylene oxide having molecular weights up to 1800, preferably up to 1200, modified diphenylmethane-diisocyanates, more preferably 4,4'-diphenylmethane-diisocyanate and/or toluene-diisocyanates.

In preparing dispersions or emulsions, successfully employed and therefore preferably used are mixtures of diphenylmethane-diisocyanates and polyphenyl-polymethylene-polyisocyanates having an NCO content of 28 to 32 weight percent.

As long as the aqueous dispersions or emulsions used according to the process of this invention are directly further processed following their preparation they do not require the addition of an emulsifier.

However, for increasing the usage time emulsifiers containing dispersions or emulsions are efficaciously used. Suitable emulsifiers are e.g. polyvinyl alcohols having an average molecular weight of 5,000 to 100,000, polyoxyalkylene polyols, more preferably polyoxyalkyleneglycols, prepared by the addition polymerization of ethylene oxide and/or 1,2-propylene oxide on an initiator molecule having 2 to 6 reactive hydrogen atoms in the presence of basic catalysts, having molecular weights of 4,000 to 20,000 more preferably 6,000 to 16,000 such as e.g. polyoxyethylene polyols, polyoxypropylene-polyols or mixed polyoxyethylene-polyoxypropylene-polyols and/or polyvinylpyrrolidone having and average molecular weight of 3,000 to 1,000,000.

Aqueous dispersions or emulsions of NCO group containing organic compounds used according to this invention may be expediently prepared in a conventional fashion by stirring the components into water at room temperature using suitable equipment.

Having proven themselves most effective are aqueous emulsions which comprise from 5 to 70 weight percent, more preferably from 15 to 40 weight percent of a mixture of diphenylmethane diisocyanates and polyphenyl-polymethylene-polyisocyanates having an NCO content from 28 to 32 weight percent, with from 0 to 28 weight percent, more preferably 0 to 15 weight percent, an emulsifier selected from the group consisting of polyoxyalkylene polyols, polyvinylpyrrolidones and/or polyvinylalcohols and an amount of water such that the total of components results in 100 weight percent.

Typical porous materials are absorbent, preferably planar arrangements like e.g. mats, quilts, non-woven or woven felt from inorganic fibrous materials like e.g. asbestos fibers, carbon fibers, glass fibers or rock wool, or natural or synthetic organic fibrous material such as e.g. jute, hemp, flax, cotton, wool, polyamides, polyacrylates or polyesters.

However, particularly useful as porous materials are open-cell flexible or semi-rigid preferably hydrophilic foams having densities up to 200 g/l more preferably 10 to 120 g/l and most preferably 30 to 60 g/l, such as e.g. foams from urea or melamine resins, olefin polymers e.g. latex and polyisoyanate polyaddition polymerization products e.g. polyurea foams, polyurea polyurethanes and particularly polyurethanes.

The flexible to semi-rigid, open-celled preferably hydrophilic polyurethane foams are especially useful as porous material due to the wide spectrum of mechanical properties, the variation possibility and their simple availability. They are able to be prepared in a conventional fashion by reacting organic, optionally modified polyisocyanates, higher molecular weight polyhydroxyl compounds, having a least 2 reactive hydrogen atoms and optionally lower molecular chain extending agents in the presence of blowing agents and catalysts as well as optionally auxiliaries and/or additives. Open-cell foams, especially polyurethane foams, in the context of this invention are foams having less than 20 percent, more preferably less than 10 percent closed cells.

In preparing the semi-rigid or preferably flexible open-celled polyurethane foams, preferably used are aromatic di- and/or polyvalent polyisocyanates which are commercially readily available. Examples are 2,4'- and 2,6-toluene-diisocyanate as well as optional mixtures of the isomers, 2,2'-, 2,4'- and 4,4'-diphenylmethane diisocyanate as well as optional mixtures of the isomers, mixtures of 2,2'-, 2,4'- and 4,4'-diphenylmethane-diisocyanate, most preferably those containing more than 50 percent of diphenylmethane-diisocyanate-isomers and mixtures of toluene-diisocynate-isomers and polymeric MDI.

The so-called modified polyisocyanates are also suitable as polyisocyanates, i.e. products which are obtained by the chemical reaction of the above mentioned polyisocyanates. Examples are: ester, urea, biuret, allophanate, and preferably carbodiimide and/or urethane group containing di- and/or polyvalent polyisocyanates, whereby preferably used are di-, tri- and/or polyoxy-alkylene-glycols having molecular weights up to 1800, e.g. with polyoxypropylene-, polyoxyethylene- and/or polyoxyethylene-polyoxypropylene-glycol modified products.

Efficaciously employed as polyhydroxyl compounds are those having functionality of 2 to 3 and hydroxyl numbers of 2 to 180, more preferably from 25 to 80.

Success has been achieved with e.g. polyester polyols which are prepared from dicarboxylic acids, more preferably aliphatic dicarboxylic acids having 2 to 12, more preferably from 4 to 6 carbon atoms and polyalcohols, more preferably diols having from 2 to 10, more preferably from 2 to 6 carbon atoms in the alkylene radical. Examples of aliphatic dicarboxylic acids are pimelic acid, suberic acid, azeleic acid, sebacic acid, undecane acid, dodecane acid, 2-methyl-pentane-dicarboxylic acid, 2-ethyl-butane-dicarboxylic acid and more preferably succinic, glutaric, and adipic acids or mixtures of at least two of the said dicarboxylic acids and aromatic dicarboxylic acids like phthalic-, isophthalic- and terephthalic acids.

Examples of di- and polyvalent, most preferably di- and trivalent alcohols are: ethylene glycol, diethylene glycol, 1,2- and/or 1,3-propylene glycol, butanediol, 2-ethyl-butanediol, pentanediol, 2-methyl-pentanediol, hexanediol, decanediol, glycerin and trimethylolpropae. In the event polyvalent or most preferably trivalent alcohols are also used in preparing the polyester polyols, then their content is calculated so that the functionality of the resulting polyester polyols is a maximum of 2.6. The polyester polyols preferably have hydroxyl numbers from 25 to 60.

Preferentially used are polyester polyols based on adipic acid-diethylene glycol-glycerin, adipic acid-propylene glycol, adipic acid-ethylene glycol-diethylene glycol, mixture of succinic, glutaric and adipic acid-diethylene glycol-glycerin or trimethylolpropane, adipic acid mixtures with 1,4-butylene glycol, 1,5-pentamethylene glycol and 1,6-hexamethylene glycol and most preferably polyester polyols prepared from adipic acid-diethylene-glycol-trimethylolpropane, adipic acid-phthalic acid-1,3-propylene-glycol-trimethylolpropane, adipic acid-phthalic acid-oleic acid -trimethylolpropane and adipic acid-glutaric acid -succinic acid-diethylene glycol or trimethylolpropane. The polyester polyols may be employed individually or in the form of mixtures.

Polyether polyols are preferably used as the polyhydroxyl compounds, which are prepared according to known processes e.g. by the anionic polymerization with alkali hydroxides like sodium or potassium hydroxides or alkali alcoholates like sodium-methylate, sodium or potassium methylate or potassium isopropylate used as catalysts or by the cationic polymerization with Lewis acids, like antimony pentachloride, boron fluoride etherate, etc., or bleaching earth as catalysts with from 1 or more alkylene oxides having from 2 to 4 carbon atoms in the alkylene radical and from an initiator molecule which contains in bonded form 2 to 4, more preferably 2 to 3 reactive hydrogen atoms.

Typical alkylene oxides are e.g. 1,3-propylene oxide,1,2- and/or 2,3-butylene oxide, and more preferably ethylene oxide and most preferably 1,2-propylene oxide. Tetrahydrofuran may also be used. The alkylene oxides may be employed individually, alternating one after another, or as mixtures. Examples of initiator molecules are e.g.: water, organic dicarboxylic acids, like e.g. succinic, adipic, phthalic and/or terephthalic acid and more preferably polyvalent, most preferably di- and/or trivalent alcohols, such as e.g. ethylene glycol, 1,2-propylene glycol and 1,3-propylene glycol, diethylene glycol, dipropylene glycol, 1,4-butylene glycol, 1,6-hexamethylene glycol, glycerin, trimethylolethane, trimethylolpropane and pentaerythritol. The polyester polyols are likewise able to be employed individually or in the form of mixtures as are the polyester polyols.

Preferentially used are di- and/or trifunctional polyether polyols having hydroxyl numbers of 25 to 80 based on polyoxypropylene-polyoxyethylene-polyols, whereby in preparing hydrophilic foams most preferably employed are polyoxypropylene-polyoxyethylene polyols, which contain in bonded form more than 50 weight percent, more preferably more than 65 weight percent of oxyethylene units in the middle and/or terminal position.

Chain extending agents are also optionally able to be incorporated into the reaction mixture for foaming in order to vary the mechanical properties of the polyurethane foams. Typical chain extending agents have molecular weights of preferably 60 to 300 and advantageously are di- or trifunctional. Trivalent alchols are examples of chain extending agents, such as e.g. trimethylolpropane and glycerin, and araliphatic glycols or glycol ethers having from 2 to 14, more preferably from 2 to 6 carbon atoms, such as e.g. bis-(2-hydroxyethyl)-hydroquinone 1,3- and/or 1,2-propandiol, 2,3-butanediol, 1,5-pentanediol, 1,6-hexandiol and preferably ethanediol, 1,4-butanediol, diethylene glycol and dipropylene glycol. The weight ratio of the polyhydroxyl compound to the chain extending agent depends on the desired mechanical properties of the final product and is able to be varied within limits of 0 to 200 weight percent, more preferably from 0 to 150 weight percent based on the weight of the polyhydroxyl compounds.

In preparing the polyurethane foams, the organic polyisocyanates and polyhydroxyl compounds as well as optionally chain extending agents, are reacted in quantities such that the ratio of NCO groups to the total of the hydroxyl groups is from 0.3 to 3.0:1, whereby in preparing hydrophilic polyurethane foams an NCO-:OH-group ratio of 0.3 to 1:1 is preferably employed.

Water is among the blowing agents which are used in the preparation of open-cell polyurethane foams, which reacts with the isocyanate groups to form carbon dioxide. The amount of water which is most efficaciously employed is from 0.2 to 12 weight percent, more preferably 4 to 8 weight percent based on the weight of the polyhydroxyl compound.

Other employable blowing agents which optionally also can be used are low boiling liquids which vaporize under the influence of the exothermic addition polymerization reaction. Liquids are suitable which are inert to the organic polyisocyanates and which exhibit boiling points not exceeding 100° C. at atmospheric pressure more preferably having boiling points from 20° C. to 100° C. Examples of such preferably used liquids are halogenated hydrocarbons such as e.g. methylene chloride, chloroform, trichlorofluoromethane, dichlorotetrafluoroethane and 1,1,2-trichloro-1,2,2-trifluoroethane. Mixtures of these low boiling point liquids are able to be used with one another and/or with other substituted or unsubstituted hydrocarbons.

The most efficacious amount of low boiling point liquid used in preparing the polyurethane foam depends on the density which one desires to achieve as well as on the amount of water employed. Generally, amounts of 0 to 50 weight percent, more preferably from 4 to 30 weight percent based on the weight of the polyhydroxyl compounds provide good results.

Preferentially used as a blowing agent is water or mixtures of water and the above mentioned chlorofluorohydrocarbons, most preferably trichlorofluoromethane.

Typical catalysts for accelerating the reaction between the higher molecular weight polyhydroxyl compounds, water, optionally chain extending agents and the organic polyisocyanates are e.g.: tertiary amines, such as e.g. dimethylbenzylamine, N,N,N',N'-tetramethyl-diamino-diethylether, bis-(dimethylaminopropyl)-urea, dimethylaminoethylethanolamine, N-methyl- and/or N-ethylmorpholine, dimethylpiperazine, N,N'-bis-(dimethylaminoethyl)-piperazine, 1-(2-hydroxyethy)-piperazine, 1,2-dimethylimidazol, 1-azabicyclo-(3,3,0)-octane, and preferably triethylenediamine, metal salts such as e.g. tin dioctoate, lead octoate, tin diethylhexoate and preferably tin (II) salts and dibutyltin dilaurate as well as most preferably mixtures of tertiary amines and organic tin salts. Preferably used is 0.1 to 2 weight percent of catalyst based on tertiary amine and/or 0.01 to 0.2 weight percent of metal salts based on the weight of the polyhydroxyl compound.

In addition, optionally auxiliaries and additives can be incorporated into the foamable reaction mixture, as they are routinely used in preparing polyurethane foams.

Examples are surfactants, flame retardants, cell regulators, anti-oxidation agents, agents protecting against hydrolysis, colorants, fillers and other additives. Additional information about the above mentioned and other common additives and auxiliaries is found in technical literature for example in the monograph *High Polymers* Volume XVI, Polyurethanes, parts 1 and 2 by J. H. Saunders and K. C. Frisch, Verlag Interscience Publishers 1962 and/or 1964 or in *Plastics Handbook*, Volume VII "Polyurethanes", first edition 1966, edited by R. Vieweg and A. Hoechtlan or the second edition 1983 edited by G. Oertel, Verlag Carl Hanser, Munich.

Depending on the type of desired mechanical properties such as e.g. damping, elastic capacity, hydrolysis stability, sound adsorption ability, insulation ability, thermoformablilty and the like, by carefully selecting the starting materials one is able to prepare open-cell, semi-rigid or preferably flexible and most preferably hydrophilic polyurethane slab stock foams having densities from preferably 0.01 to 0.12 $g/cm^3$ and most preferably 0.03 to 0.06 $g/cm^3$ using conventional methods, e.g. continously on ordinary slab stock foam machines or batchwise in open molds.

From the resulting polyurethane-slab stock foam block, which may reach sizes up to $60 \times 2 \times 1$ m, or from the open-cell, semi-rigid or more preferably flexible and most preferably hydrophilic foams from other materials, if necessary one is able to cut dimensioned slab stock foam blocks corresponding to the molded articles which are to be prepared and the blocks when free from both waste and dust as best possible are able to be cut into foam blocks having a thickness from 2 millimeters to 200 millimeters, more preferably 3 to 100 mm and most preferably 5 to 40 mm. Suitable for this purpose are all ordinary industrial cutting devices, whereby preferably used in practice is an oscillating hot wire cutting saw. One should pay attention here only to the particularly large size foam blocks so that they have sufficient, high mechanical stability in order to be able to withstand e.g. transportation without damage occurring.

In preparing the light weight, planar molded articles using the process of the invention, the planar arrangements, more preferably the foam blocks, are treated with an aqueous dispersion or emulsion of an NCO group containing organic compound or a mixture of NCO group containing organic compounds. The effective amount of the NCO group containing organic compound for a certain porous material is easily determined by an initial experiment.

The aqueous dispersion or emulsion of an NCO group containing organic compound is applied to the planar arrangement of fibrous material so that the upper surfaces of the individual fibers are coated and so that any reactive species from the fibrous upper surface are able to react with the isocyanate compound. It is not necessary that the fibrous material or the surface of the foam plaques be free from the NCO group reactive residue since the isocyanate groups will be predominantly converted into polyurea groups by the interaction of water.

Treating the planar arrangements of fibrous material or the open-celled foams, which already may have their final form or which preferably are still block shaped and which subsequently will be formed into molded articles, occurs using the aqueous dispersion or emulsion of isocyanate compounds according to conventional methods, such as e.g. by painting, spraying, an application with a trowel, impregnating, etc. Following one of the preferred embodiments employed, the porous, planar materials are impregnated by submersion in a bath at temperatures from 10° C. to 60° C., more preferably 18° C. to 30° C. using such a quantity of aqueous dispersion or emulsion so that the NCO content is from 1 to 300 weight percent, more preferably from 5 to 240 weight percent, based on the weight of the porous planar material. Through the subsquent pressing out of the liquid, the NCO content is adjusted so that the treated open-cell material before the isocyanate groups cure has an NCO content from 1 to 70 weight percent, more preferably from 5 to 60 weight percent, based on the weight of the porous material. Understandably, pressing out excess aqueous dispersion or emulsions need not occur if other methods, e.g. spraying, are used to apply the necessary effective quantities directly.

Inasmuch as porous materials already possess the spacial dimension of the molded article, these can be stored at room temperature or at an elevated temperature following the treatment with the aqueous dispersion or emulsion of NCO group containing organic compounds, whereby the isocyanate compounds react and the products cure.

However, in order to shorten the tack free time and finishing times, it has proven to be effective to impregnate the porous materials treated in this fashion with at least one catalyst or more preferably with an aqueous or alcoholic catalyst solution in order to accellerate the isocyanate additional polymerization reaction. Typical catalysts are e.g. the tertiary amines already described for preparing polyurethane foams, which ordinarily are used in quantities 0.001 to 1.0 weight percent based on the NCO content of the treated porous materials.

Following a preferred processing procedure, the porous materials, especially the open-celled polyurethane foam blocks treated with aqueous dispersions or emulsions of NCO group containing compounds and preferably employing a polyurethane catalyst are placed in a mold made of plastic or metal for the molding process.

Preferably a tempered mold of metal, e.g. steel or cast aluminum, is employed and the block then molded at a temperature from 25° C. to 180° C., more preferably 110° C. to 180° C., using a pressure up to 50 bar, more preferably 3 to 10 bar, within 0.5 to 15 minutes, more preferably from 1 to 10 minutes, whereby the isocyanate groups react and thereafter the resulting molded article is demolded.

Molded articles, especially those having a complicated shape, are prepared preferably using a batch process. However, molded articles having relatively simple shapes such as e.g. plaques, profile plaques, shells, etc., are able to be prepared using continous process.

Planar molded articles prepared according to the process of invention, which preferably have a density of 0.015 to 0.25 $g/cm^3$ and which have a thickness of 0.1 to 40 mm, are able to be directly utilized commercially e.g. for heat insulation and sound insulation or as motor compartment coverings.

If desired, the treated, porous materials additionally are able to be provided with a strengthening and/or decorating material on one or both sides in the mold at the same time of molding or thereafter in a separate step, whereby at least one of the coating layers must comprise a water permeable material if the molding and coating are to be carried out simultaneously. The strengthening and/or decorating materials are placed into the mold and then bonded under pressure to the porous materials with the help of e.g. spray adhesives, laminating adhesives or melt adhesives.

Examples of strengthening materials or uncolored or directly single colored or printed decorating materials are: woven or nonwoven from glass, carbon, plastic or textile fibers, films from metals such as e.g. aluminum, copper, brass, gold or sheet steel up to 0.3 mm thick, polyvinylchloride, acrylonitrile-butadiene-stryene-polymers, polyamide, polyesters, polyethylene, polypropylene, sawdust filled polypropylene, cellulose esters and mixed esters, paper board or paper webbing.

The light weight, planar molded-articles prepared according to the process of invention are used as self supporting construction parts, strengthening parts, or as molded articles in the railroad industry, automotive industry and aircraft industry, e.g. as headliners, door and wall supports, instrument panels and consoles and motor compartment coverings. However, the products are also employed as coverings in the furniture industry, the phonographic and television industry and in the building industry.

EXAMPLE I a. Preparing an aqueous polyisocyanate emulsion 25 parts by weight of an emusifier comprising 10 parts by weight of an aqueous solution of 1 part by weight of polyvinylpyrrolidone having an average molecular weight of 360,000 and 12 parts by weight of polyoxyethylene glycol having an average molecular weight of 9,000 were dissolved in 125 parts by weight of water, and emulsified in 30 to 120 seconds while stirring using a high speed stirrer (product examples are Tornado ® or Turrax ® or a static mixer) in 50 parts by weight of a mixture of diphenylmethane diisocyanate and polyphenyl-polymethylene-polyisocyanates (Polymeric MDI) having an NCO content of 31 weight percent.

Directly after its preparation the aqueous polymeric MDI emulsion had an NCO content of about 15 weight percent and was processable for 6 hours.

b. Preparation of a hydrophilic polyurethane foam

A Component, A mixture comprising:
15 parts by weight of polyethylene glycol having a hydroxyl number of 200,
40 parts by weight of a polyoxypropylene polyol having a hydroxyl number of 400, prepared from a sucrose-glycerin mixture as a initiator (Lupranol ®3321),
10 parts by weight of a polyoxypropylene triol initiated wth glycerin having a hydroxyl number of 400,
20 parts by weight of diethylene glycol,
15 parts by weight of a polyoxypropylene-polyoxyethylenetriol initiated with glycern having terminal ethylene oxide units and having a hydroxyl number of 28,
6 parts by weight of water,
0.4 parts by weight of a silicone oil (Tegostab ® B8408 from the Goldschmidt Co., Essen) and,
0.4 parts by weight of dimethylcyclohexylamine.
B Component
A mixture comprising diphenylmethane-diisocyanate and polyphenyl-polymethylene-polyiscyanates having an NCO content of 31 weight percent.

The A and B components were intensively mixed together in a weight ratio of 100:98, corresponding to an NCO index of about 50, using the one shot process in a multiple component mix head at room temperature (23° C.), and then foamed into a foam block having the dimensions 30×30×30 cm in an open mold.

The resulting open-celled flexible polyurethane foam had a density of 0.025 g/cm³.

c. Preparing the molded article

A foam sheet having a gradually increasing thickness from 0.1 to 10 mm was cut from the polyurethane slab stock foam block, prepared according to example 1 b. This was than impregnated with about 300 grams of aqueous polymeric MDI emulsion of example la per 1,000 cm³, of foam block and subsequently the excess polymeric MDI emulsion was pressed out so that the treated polyurethane foam block had an NCO content of 10 weight percent.

The foam block was thereafter sprayed with dimethylcyclohexylamine, and after 60 seconds it was placed in a 120° C. tempered mold made from superior alloy steel, and was molded under a pressure of about 5 bar in 10 minutes.

The following mechanical properties on the molded article which was post-cured for 1 hour at 105° C. without losing its molded structure were determined:

| | | |
|---|---|---|
| Thickness | [mm] | 0.1 to 10 (gradually increasing) |
| Density according to DIN 53 420 | [g/cm³] | 0.05 |
| Tensile strength according to DIN 53 571 | [k PA] | 200 |
| Elongation at break according to DIN 53 571 | [%] | 21 |
| Compression hardness at a 40% load according to DIN 53 577 | [k Pa] | 77 |
| Thermal flexural strength according to DIN 53 424 | [°C.] | 128 | d. Comparative Example

An untreated foam block having a thickness of 10 mm, cut from the foam block according to example 1 b, was placed in the 180° C. tempered superior steel alloy mold and molded under a pressure of about 5 bar in 10 minutes.

The resulting molded article completely lost its molded structure when post-cured at 105° C. for 1 hour.

The embodiments of the invention in which an exclusive privilege or property is claimed are defined as follows:

1. A process for the preparation of lightweight, planar molded articles by treating porous materials with an effective amount of an organic compound containing NCO groups and allowing the isocyanate compound to cure, optionally while molding, wherein the organic compound containing the NCO groups is used in the form of a non-flammable aqueous dispersion or emulsion.

2. The process of claim 1 wherein open-cell, hydrophillic foams are used as said porous materials.

3. The process of claim 1 wherein flexible or semi-rigid, open-cell polyurethane foams, having a density of from 0.010 to 0.120 g/cm³ are used as said porous materials.

4. The process of claim 1 wherein the aqueous dispersions or emulsions, comprise from 5 to 70 weight percent of at least one organic polyisocyanate and/or at least one modified organic polyisocyanate, from 0 to 28 weight percent of at least one emulsifier, and the remainder is water so that the total of components results in 100 weight percent.

5. The process of claim 1 wherein the aqueous emulsion comprises from 5 to 70 weight percent, preferably of from 15 to 40 weight percent, of a mixture comprising diphenylmethane diisocyanates and polyphenylpolymethylene polyisocyanates having an NCO content of from 28 to 32 weight percent, from 0 to 28 weight percent of an emulsifier selected from the group consisting of polyoxyalkylene polyols, polyvinyl pyrrolidones and polyvinyl alchols, and a precise amount of water so that the total of components results in 100 weight percent.

6. The process of claim 1 wherein the porous materials, preferably open cell polyurethane plastics, are treated with such an amount of aqueous polyisocyanate dispersion or polyisocyanate emulsion so that before the isocyanate groups cure they possess an NCO content of from 1 to 70 weight percent based on the weight of the porous materials.

7. The process of claim 1 wherein the porous materials treated with an effective amount of aqueous polyisocyanate-dispersion or polyisocyanate-emulsion are allowed to cure at a temperature of from 25° C. to 180° C.

8. The process of claim 1 wherein the flexible or semi-rigid, open-cell polyurethane foams, which are treated with an effective amount of an aqueous emulsion comprising a mixture of diphenylmethane-diisocyanates and polyphenylpolymethylene polyisocyanates, are allowed to cure at a temperature of from 25° C. to 180° C. and under a pressure of from 1 to 50 bar in a mold.

9. A process for the preparation of lightweight, planar molded articles by treating porous materials with an effective amount of an organic compound containing NCO groups and allowing the isocyanate compound to cure, optionally while molding, wherein open cell foams are impregnated with a non-flammable aqueous dispersion and emulsion comprising at least one organic polyisocyanate and subsequently the polyisocyanates are crosslinked.

10. The process of claim 9 wherein open-cell, hydrophillic foams are used as said porous materials.

11. The process of claim 9 wherein flexible or semi-rigid, open-cell polyurethane foams, having a density of from 0.010 to 0.120 g/cm$^3$ are used as said porous materials.

12. The process of claim 9 wherein the aqueous dispersions or emulsions, comprise from 5 to 70 weight percent of at least one organic polyisocyanate and/or at least one modified organic polyisocyanate, from 0 to 28 weight percent of at least one emulsifier, and the remainder is water so that the total of components results in 100 weight percent.

13. The process of claim 9 wherein the aqueous emulsion comprises from 5 to 70 weight percent, preferably of from 15 to 40 weight percent, of a mixture comprising diphenylmethane diisocyanate and polyphenylpolymethylene polyisocyanates having an NCO content of from 28 to 32 weight percent, from 0 to 28 weight percent of an emulsifier selected from the group consisting of polyoxyalkylene polyols, polyvinyl pyrrolidones and polyvinyl alchols, and a precise amount of water so that the total of components results in 100 weight percent.

14. The process of claim 9 wherein the porous materials, preferably open cell polyurethane plastics, are treated with such an amount of aqueous polyisocyanate dispersion or polyisocyanate emulsion so that before the isocyanate groups cure they possess an NCO content of from 1 to 70 weight percent based on the weight of the porous materials.

15. The process of claim 9 wherein the porous materials treated with an effective amount of aqueous polyisocyanate-dispersion or polyisocyanate-emulsion are allowed to cure at a temperature of from 25° C. to 180° C.

16. The process of claim 9 wherein the flexible or semi-rigid, open-cell polyurethane foams, which are treated with an effective amount of an aqueous emulsion comprising a mixture of diphenylmethane-diisocyanates and polyphenylpolymethylene polyisocyanates, are allowed to cure at a temperature of from 25° C. to 180° C. and under a pressure of from 1 to 50 bar in a mold.

17. Planar polyurethane molded articles prepared by the process of claim 1 having a thickness of from 0.1 to 40 mm,
 a density of from 0.015 to 0.25 g/cm$^3$,
 a tensile strength, according to DIN 53 571, of from 100 to 500 k.Pa,
 an elongation at break, according to DIN 53 571, of from 10 to 70 percent,
 a compression hardness at a 40 percent load, according to DIN 53 577, of from 10 to 100 k.Pa, and
 a thermal flexural strength, according to DIN 53 242, of from 100° C. to 160° C.

18. The planar polyurethane molded articles prepared by the process of claim 9 having a thickness of from 0.1 to 40 mm,
 a density of from 0.015 to 0.25 g/cm$^3$,
 a tensile strength, according to DIN 53 571, of from 100 to 500 k.Pa,
 an elongation at break, according to DIN 53 571, of from 10 to 70 percent,
 a compression hardness at a 40 percent load, according to DIN 53 577, of from 10 to 100 k.Pa, and
 a thermal flexural strength, according to DIN 53 242, of from 100° C. to 160° C.

* * * * *